US012635779B2

(12) United States Patent
Fei et al.

(10) Patent No.: US 12,635,779 B2
(45) Date of Patent: May 26, 2026

(54) SMART COSMETIC DEVICE

(71) Applicant: PixArt Imaging Inc., Hsin-Chu City (TW)

(72) Inventors: Ming Shun Manson Fei, Hsin-Chu City (TW); Sen-Huang Huang, Hsin-Chu City (TW); Ting-Yang Chang, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 0 days.

(21) Appl. No.: 18/896,873

(22) Filed: Sep. 25, 2024

(65) Prior Publication Data

US 2025/0113907 A1 Apr. 10, 2025

Related U.S. Application Data

(60) Provisional application No. 63/542,498, filed on Oct. 4, 2023.

(51) Int. Cl.

| | |
|---|---|
| ***A45D 34/04*** | (2006.01) |
| ***B05B 12/12*** | (2006.01) |
| *A45D 34/00* | (2006.01) |

(52) U.S. Cl.
CPC .............. *A45D 34/04* (2013.01); *B05B 12/12* (2013.01); *A45D 2034/002* (2013.01); *A45D 2200/057* (2013.01)

(58) Field of Classification Search
CPC .......................... A45D 2200/057; B05B 12/12
USPC .......................................................... 401/190
See application file for complete search history.

(56) References Cited

U.S. PATENT DOCUMENTS

2024/0138543 A1* 5/2024 Charraud ................ B05B 12/12
2025/0318629 A1* 10/2025 Aidan .................. A45D 44/005

FOREIGN PATENT DOCUMENTS

KR 20200053802 A * 5/2020 ............. A61B 5/441

* cited by examiner

*Primary Examiner* — Jennifer C Chiang
(74) *Attorney, Agent, or Firm* — Winston Hsu

(57) ABSTRACT

A smart cosmetic device includes a main body, an optical detection module and a cosmetic applicator. The optical detection module is disposed within the main body and adapted to detect a predefined feature of a target object. The cosmetic applicator is disposed within the main body and has an accommodated chamber where inside cosmetic material is disposed. The cosmetic applicator is adapted to spray the cosmetic material to a specific area of the target object in accordance with the predefined feature.

18 Claims, 3 Drawing Sheets

SMART COSMETIC DEVICE

CROSS REFERENCE TO RELATED APPLICATIONS

This application claims the benefit of U.S. Provisional Application No. 63/542,498, filed on Oct. 4, 2023. The content of the application is incorporated herein by reference.

BACKGROUND OF THE INVENTION

1. Field of the Invention

The present invention relates to a smart cosmetic device, and more particularly, to a smart cosmetic device of spraying cosmetic material to a target object in accordance with a detected feature of the target object.

2. Description of the Prior Art

Conventional makeup process is that the user faces the mirror and manually applies cosmetic material on the face with a makeup tool; the conventional makeup process needs a lot of practice to apply the satisfied makeup, and may be failed sometimes and need to reapply the makeup. Although there is an automatic makeup device on the market, the conventional automatic makeup device only applies the makeup pattern on a blank area as an effect display, and cannot spray the cosmetic material on the face based on the facial features. Therefore, design of a smart cosmetic device of detecting the facial features and accordingly spraying the cosmetic material on the face is an important issue in the cosmetics and beauty industry.

SUMMARY OF THE INVENTION

The present invention provides a smart cosmetic device of spraying cosmetic material to a target object in accordance with a detected feature of the target object for solving above drawbacks.

According to the claimed invention, a smart cosmetic device includes a main body, an optical detection module and a cosmetic applicator. The optical detection module is disposed within the main body and adapted to detect a predefined feature of a target object. The cosmetic applicator is disposed within the main body and has an accommodated chamber where inside cosmetic material is disposed. The cosmetic applicator is adapted to spray the cosmetic material to a specific area of the target object in accordance with the predefined feature.

According to the claimed invention, the main body includes a first surface and a second surface opposite to each other, a detection surface of the optical detection module and a spraying surface of the cosmetic applicator are respectively located on the first surface and the second surface, or the detection surface of the optical detection module and the spraying surface of the cosmetic applicator are both located on one of the first surface and the second surface.

According to the claimed invention, the optical detection module directly captures a detection image containing the target object, and analyzes the detection image to acquire position information of the predefined feature. Or, the optical detection module captures a detection image containing the target object appeared in a mirror, and analyzes the detection image to acquire position information of the predefined feature.

According to the claimed invention, the main body includes a specific mark, and the optical detection module analyzes the detection image to further acquire position relation between the specific mark and the predefined feature. The optical detection module and the cosmetic applicator are respectively located on two opposite surfaces of the main body, the specific mark and the optical detection module are located on the same surface of the main body.

According to the claimed invention, the optical detection module identifies all features of the target object, and acquires position relation between the predefined feature and other features accordingly. Or, the optical detection module identifies a reference point of the target object, and acquires a distance and a direction of the predefined feature relative to the reference point in accordance with an optical tracking result of the optical detection module.

According to the claimed invention, the optical detection module includes at least one of an optical tracking sensor, an imager capturing sensor and a thermal sensor. The cosmetic applicator determines whether the optical detection module aligns with the predefined feature of the target object in accordance with a detection result of the optical detection module. The cosmetic applicator is automatically activated to spray the cosmetic material to the specific area of the target object when the optical detection module aligns with the predefined feature.

According to the claimed invention, the smart cosmetic device further includes an alarm unit electrically connected to the optical detection module, and adapted to output a warning signal when a detection result of the optical detection module conforms to a predefined condition. The warning signal output by the alarm unit is a sound signal or a flash signal.

According to the claimed invention, the cosmetic applicator sprays the cosmetic material in batches to the specific area of the target object in accordance with a motion detection result of the optical detection module relative to the target object. The cosmetic applicator controls concentration or color of the cosmetic material sprayed to the specific area of the target object in accordance with an identification result of the optical detection module relative to the predefined feature.

According to the claimed invention, the smart cosmetic device further includes a level detector disposed within the main body and adapted to detection a tilted angle of the main body. The level detector is a gyroscope adapted to detect and maintain an arranged angle of the main body. The smart cosmetic device further includes an alarm unit electrically connected to the level detector, and adapted to output a warning signal when a detection result of the level detector when a detection result of the level detector belonging to an abnormal situation.

According to the claimed invention, the smart cosmetic device further includes an image receiver electrically connected to the cosmetic applicator, and the cosmetic applicator sprays the cosmetic material in accordance with the predefined feature and a reference image received by the image receiver. The smart cosmetic device is a portable cosmetic device, or is a fixed cosmetic device installed at a specific position.

According to the claimed invention, the main body further includes a preset mark and a control button, the preset mark is disposed on the first surface, the control button is electrically connect with the optical detection module and the cosmetic applicator, and adapted to drive the cosmetic applicator to spray the cosmetic material in accordance with a distance relative to the target object detected by the optical detection module.

The smart cosmetic device of the present invention can dispose the optical detection module and the cosmetic applicator respectively on the opposite surfaces of the main body for utilization with the mirror, or can dispose the optical detection module and the cosmetic applicator both on the same surface of the main body without using the mirror. The smart cosmetic device can utilize the optical detection module to detect the predefined features of the target object for acquiring the facial contour and the facial features of the user, and select and define some predefined feature as the reference point for computing the position change of the other predefined features and the reference point within the detection image, and then acquiring the relative position between the smart cosmetic device and the target object; therefore, the smart cosmetic device can quickly and correctly compute an initial point and an ending point and a trace between the initial point and the ending point of automatic makeup process, so the user can move the smart cosmetic device or the specific area of the target object via the indication symbol generated by the initial point and the ending point and the trace, and automatically or manually activate the cosmetic applicator to spray the cosmetic material to the correct position on the target object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
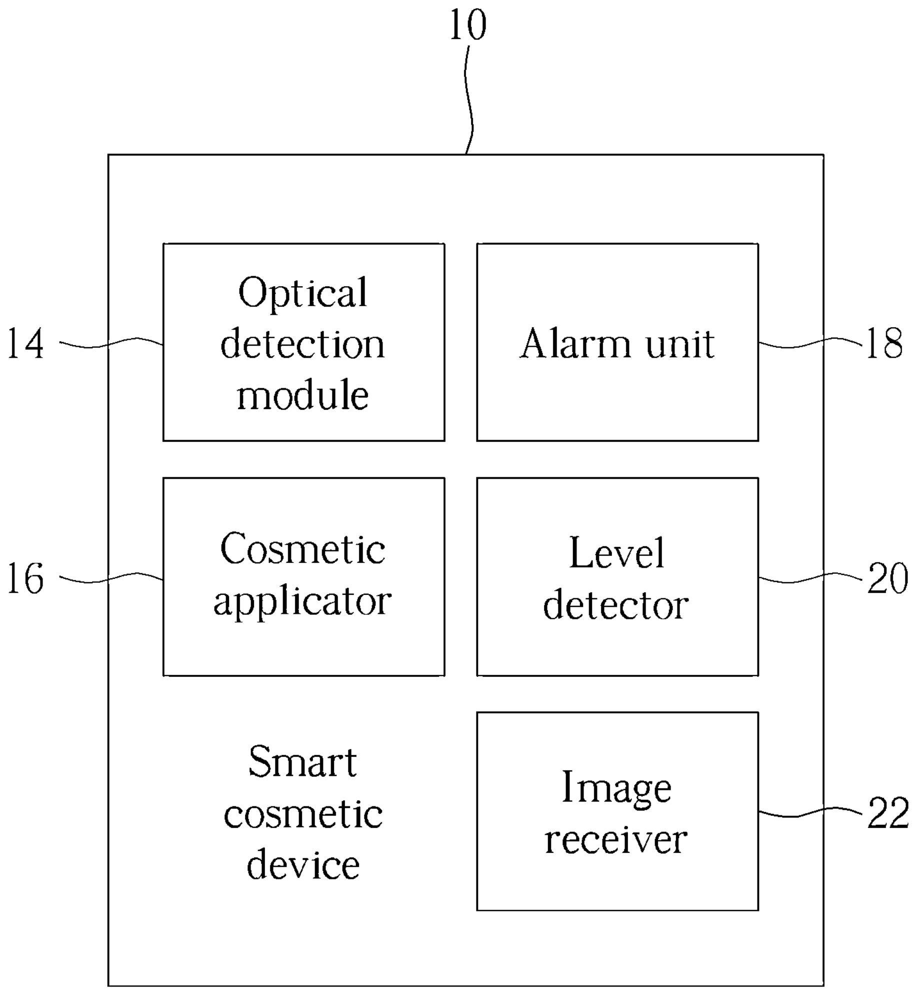
FIG. 1 is a functional block diagram of a smart cosmetic device according to an embodiment of the present invention.
Figure 2:
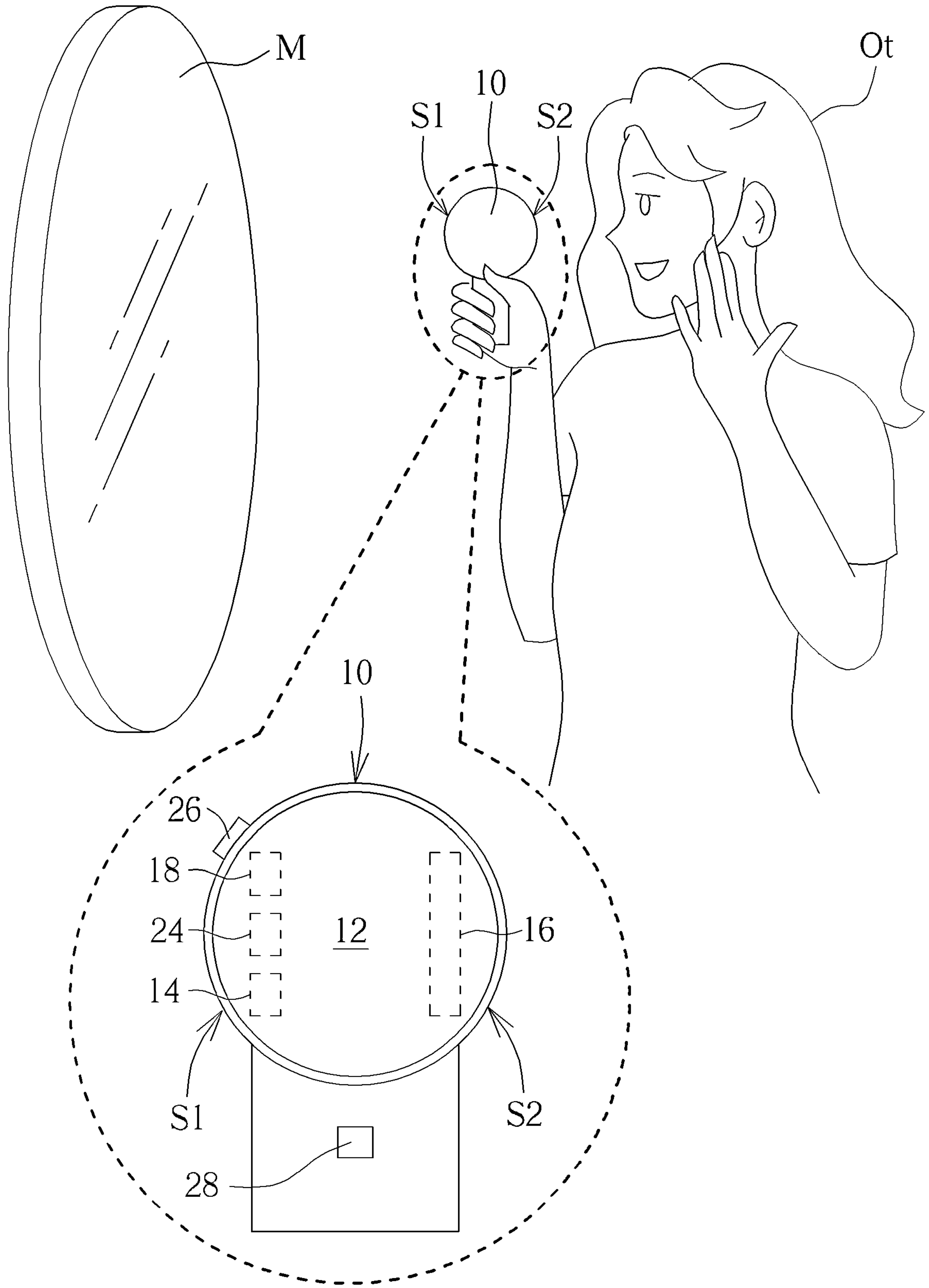
FIG. 2 and FIG. 3 are application diagrams of the smart cosmetic device according to different embodiments of the present invention.
Figure 3:
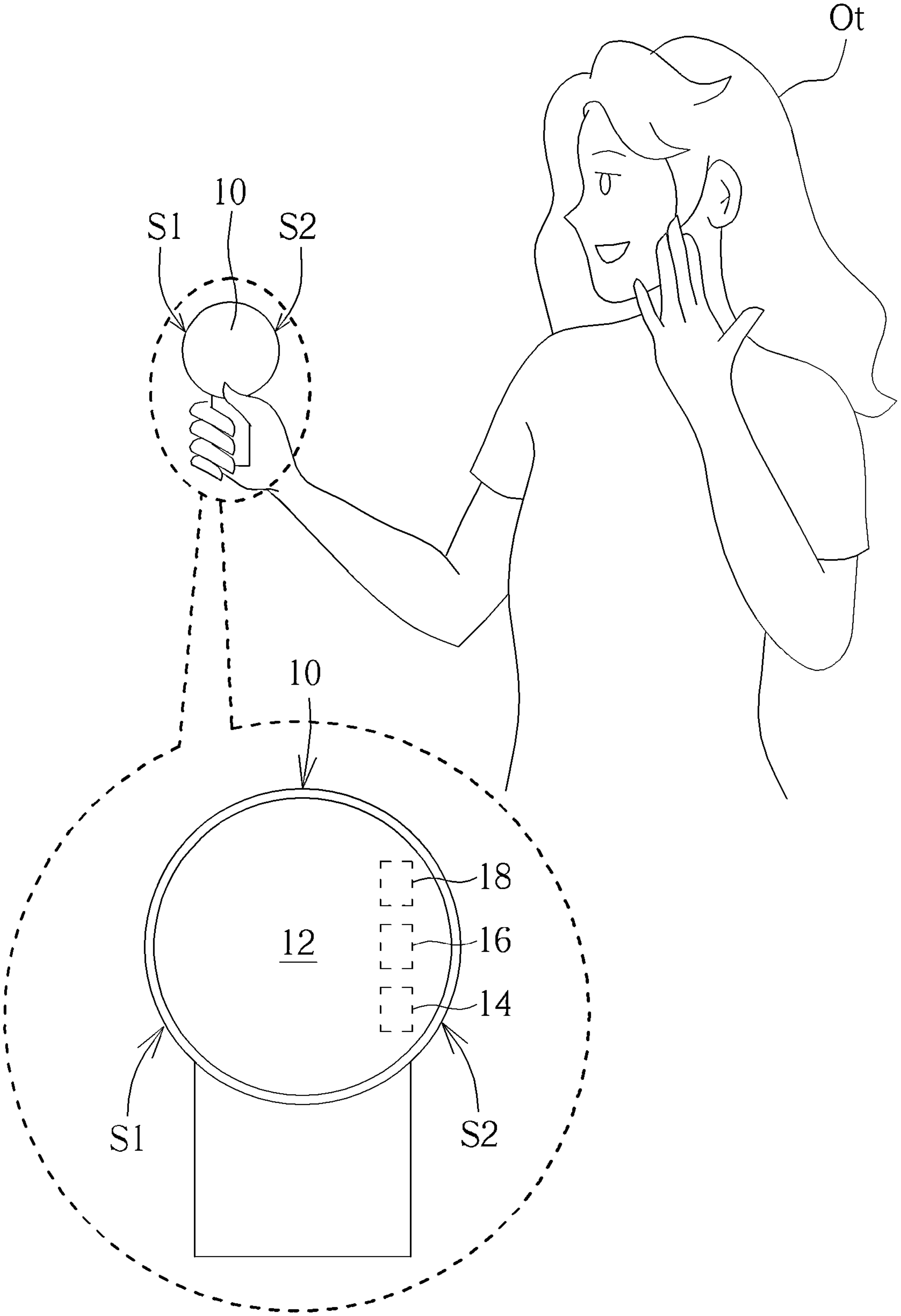

Please refer to FIG. 1 to FIG. 3. FIG. 1 is a functional block diagram of a smart cosmetic device 10 according to an embodiment of the present invention. FIG. 2 and FIG. 3 are application diagrams of the smart cosmetic device 10 according to different embodiments of the present invention. The smart cosmetic device 10 can be a portable cosmetic device, or a fixed cosmetic device installed at a specific position; variation of the smart cosmetic device 10 can depend on a design demand. The embodiment shown in FIG. 2 and FIG. 3 can be the portable smart cosmetic device 10. The smart cosmetic device 10 can optionally include a main body 12, an optical detection module 14, a cosmetic applicator 16, an alarm unit 18, a level detector 20 and an image receiver 22.

The optical detection module 14 can include at least one of an optical tracking sensor, an imager capturing sensor and a thermal sensor, and used to detect a predefined feature of a target object Ot. For example, the target object Ot can be a user holding the smart cosmetic device 10, and the predefined feature can be an eyebrow, a cheek or lips of the user. The cosmetic applicator 16 can accommodate cosmetic material (which is not marked in the figures). The cosmetic applicator 16 can have a processing unit used to determine whether the optical detection module 14 aligns with the predefined feature of the target object Ot in accordance with a detection result of the optical detection module 14, and can spray the cosmetic material to a specific area (such as drawing the eyebrows or applying the blush or lipstick) of the target object Ot relevant to the predefined feature in accordance with known position offset between the optical detection module 14 and the cosmetic applicator 16.

In the preferred embodiment of the present invention, the optical detection module 14 can detect all facial features of the target object Ot, such as the eyebrows, the cheeks and the lips of the user, and compute relative position between the predefined feature and other non-predefined features according to the detected facial features, so that the smart cosmetic device 10 can utilize an identification result (such as finding a front end or a rear end of the eyebrows) to estimate spraying concentration, a spraying shape and spraying color of the cosmetic material that needs to be sprayed by the cosmetic applicator 16, which means the smart cosmetic device 10 can calculate a ratio of the facial features of the user's face to provide an optimal makeup effect. In addition, the optical detection module 14 can detect a reference point (which is not marked in the figures) of the target object Ot; the reference point may be an easily identifiable location on the user's face, such as a tip of the eyebrow, a tip of the nose, or a corner of the mouth. During relative motion between the smart cosmetic device 10 and the target object Ot, the optical detection module 14 can acquire a distance and a direction of the predefined feature of the target object Ot relative to the reference point in accordance with its optical tracking result, so as to ensure that the cosmetic applicator 16 can spray the cosmetic material to the correct specific area of the target object Ot.

The alarm unit 18 can be electrically connected with the optical detection module 14 and/or the level detector 20, and used to output a warning signal when a detection result of the optical detection module 14 conforms to a predefined condition and/or a detection result of the level detector 20 belongs to an abnormal situation. For example, if the optical detection module correctly detects the predefined feature of the target object Ot, the detection result conforms to the predefined condition, and the alarm unit 18 can output the warning signal such as pleasant sound or continuous green light to remind the user for activation of the cosmetic applicator 16; if the optical detection module does not detect the predefined feature of the target object Ot, the detection result does not conform to the predefined condition, and the alarm unit 18 can output the warning signal such as rapid sound or flashing red light to inform the user that position of the smart cosmetic device 10 must be adjusted and the cosmetic applicator 16 cannot be activated. Therefore, the warning signal output by the alarm unit 18 can be the sound signal or the flash signal.

The level detector 20 can detect a tilted angle of the main body 12 and be used to ensure that the cosmetic applicator 16 can spray the cosmetic material to the specific area of the target object Ot at the correct angle. The level detector 20 may be a gyroscope, or any detector with similar functions; an element of detecting and maintaining an arranged angle of the main body 12 can conform to a design aim of the level detector 20 in the present invention. When the level detector 20 detects that the main body 12 meets the preset tilted angle, the detection result is normal, and the alarm unit 18 can output the pleasant sound or the continuous green light; when the level detector 20 detects that the main body 12 does not meet the preset tilted angle, the detection result is abnormal, and the alarm unit 18 can output the rapid sound or the flashing red light. Practical application of the alarm unit 18 is not limited to the foresaid embodiments, and depends on the design demand.

Besides, the alarm unit 18 may further have a display interface. The smart cosmetic device 10 can drive the display interface of the alarm unit 18 to show an indication symbol, such as an arrow, when the optical detection module 14 detects the predefined feature of the target object Ot and decides a makeup pattern; the user can change the relative position between the smart cosmetic device 10 and the target object Ot by moving the smart cosmetic device 10 or rotating the predefined feature of the target object Ot in accordance with the indication symbol, and therefore the cosmetic applicator 16 can spray the cosmetic material to the correct specific area of the target object Ot for forming the makeup pattern.

The image receiver 22 can be an optional element electrically connected with the cosmetic applicator 16. In the possible embodiment of the present invention, the user may use the smart phone to capture a reference image of an area (such as the face) to be put on makeup, and apply the favorite makeup pattern for the reference image based on the built-in pattern in the database of the smart phone. When the makeup pattern is decided after selection and edition, the image receiver 22 of the smart cosmetic device 10 can receive the reference image captured by the smart phone in a wire manner or in a wireless manner, so that the cosmetic applicator 16 can compare the reference image from the image receiver 22 with the predefined feature of the target object Ot detected by the optical detection module 14, and correctly decide the relative position between the multiple predefined features (such as the eyebrows, the cheeks and the lips of the user) of the target object Ot, so as to spray the cosmetic material accurately to the predefined feature of the target object Ot.

That is to say, the image receiver 22 can be used to assist the optical detection module 14. The user can capture the reference image by an external device (such as the smart phone) to select and emit the makeup pattern, and the smart cosmetic device 10 can utilize the image receiver 22 to receive the selected and edited result of the makeup pattern, and accordingly activate the cosmetic applicator 16 to spray the cosmetic material to the specific area of the target object Ot relevant to the predefined feature, for easily completing the favorite makeup pattern; the user does not need to be skilled in makeup for achieving the favorite makeup pattern.

The main body 12 can have a first surface S1 and a second surface S2 opposite to each other. As the embodiment shown in FIG. 2, a detection surface of the optical detection module 14 and a spraying surface of the cosmetic applicator 16 can be respectively disposed on the first surface S1 and the second surface S2 of the main body 12. The optical detection module 14 can face towards a mirror M, and capture a detection image of the target object Ot appearing on the mirror M and then analyze the detection image to acquire position information of the predefined feature of the target object Ot. It should be mentioned that a specific mark 24 can be optionally disposed on the main body 12. The specific mark 24 and the optical detection module 14 can be both disposed on the first surface S1 of the main body 12. When the optical detection module 14 faces towards the mirror M and captures the detection image, the specific mark 24 and the target object Ot are appeared within the detection image. The optical detection module 14 can analyze the detection image to find out the relative position between the specific mark 24 and the predefined feature of the target object Ot, and the cosmetic applicator 16 can accordingly spray the cosmetic material to the correctly predefined feature of the target object Ot via the foresaid relative position of the specific mark 24.

As the embodiment shown in FIG. 3, the detection surface of the optical detection module 14 and the spraying surface of the cosmetic applicator 16 can be disposed on the same surface of the main body 12, such as the first surface S1 or the second surface S2; position of the optical detection module 14 and the cosmetic applicator 16 can depend on the design demand. The user can face the optical detection module 14 towards himself or herself, so the optical detection module 14 can directly capture the detection image containing the target object Ot, and analyze the detection image to acquire the position information of the predefined feature of the target object Ot. Therefore, the user can operate the smart cosmetic device 10 of this embodiment without the mirror; the smart cosmetic device 10 can utilize the alarm unit 18, the level detector 20 or other assisted detector to decide whether the cosmetic applicator 16 correctly aligns with the predefined feature of the target object Ot, or decide whether the cosmetic applicator 16 is tilted relative to the target object Ot.

In the actual application of the present invention, the user can manually hold the smart cosmetic device 10 or fix the smart cosmetic device 10 at the specific position via an external component, and then shift or rotate the head; the optical detection module 14 can acquire a motion detection result (such as vertical motion, horizontal motion or rotation) of the target object Ot, and the cosmetic applicator 16 can spray the cosmetic material in batches to the specific area of the target object Ot in accordance with the motion detection result of the optical detection module 14 relative to the target object Ot, so as to gradually draw shapes of the eyebrow or the blush. Further, in another actual application of the present invention, the user's head can be stationery, and the user can manually move the smart cosmetic device 10 around the predefined feature of the target object Ot; in the meantime, the optical detection module 14 can acquire the motion detection result between the target object Ot and the smart cosmetic device 10, and the cosmetic applicator 16 can spray the cosmetic material in batches accurately to the specific area of the target object Ot in accordance with position change of the optical detection module 14 relative to the target object Ot.

Moreover, as shown in FIG. 2, the main body 12 can optionally include a preset mark 26 and a control button 28. The preset mark 26 can be disposed on the first surface S1 of the main body 12. The control button 28 can be electrically connect with the optical detection module 14 and the cosmetic applicator 16, and disposed on a handle of the main body 12. The preset mark 26 can be a visual aiming point located on an outer surface of the main body 12. The user can manually adjust position of the smart cosmetic device 10 when holding the smart cosmetic device 10 and facing the mirror M, so as to align the preset mark 26 with the facial feature (such as the middle of the eyes) in the mirror M. When the preset mark 26 is aligned with the facial feature, the user can press the control button 28 to activate the optical detection module 14 and the cosmetic applicator 16, and according shift or rotate the head. The optical detection module 14 can compute a distance of the smart cosmetic device 10 relative to the target object Ot, and motion of the target object Ot, so the cosmetic applicator 16 can spray the cosmetic material in accordance with the detection result of the optical detection module, and the cosmetic material can be correctly sprayed to the specific area of the target object Ot.

In conclusion, the smart cosmetic device of the present invention can dispose the optical detection module and the cosmetic applicator respectively on the opposite surfaces of the main body for utilization with the mirror, or can dispose the optical detection module and the cosmetic applicator both on the same surface of the main body without using the mirror. The smart cosmetic device can utilize the optical detection module to detect the predefined features of the target object for acquiring the facial contour and the facial features of the user, and select and define some predefined feature as the reference point for computing the position change of the other predefined features and the reference point within the detection image, and then acquiring the relative position between the smart cosmetic device and the target object; therefore, the smart cosmetic device can quickly and correctly compute an initial point and an ending point and a trace between the initial point and the ending point of automatic makeup process, so the user can move the smart cosmetic device or the specific area of the target object via the indication symbol generated by the initial point and the ending point and the trace, and automatically or manually activate the cosmetic applicator to spray the cosmetic material to the correct position on the target object.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smart cosmetic device comprising:

a main body;

an optical detection module disposed within the main body and adapted to detect a predefined feature of a target object; and a cosmetic applicator disposed within the main body and having cosmetic material, the cosmetic applicator being adapted to spray the cosmetic material to a specific area of the target object in accordance with the predefined feature;

wherein the optical detection module captures a detection image containing the target object appeared in a mirror, and analyzes the detection image to acquire position information of the predefined feature;

wherein the main body comprises a specific mark, the optical detection module analyzes the detection image to further acquire position relation between the specific mark and the predefined feature.

2. The smart cosmetic device of claim 1, wherein the main body comprises a first surface and a second surface opposite to each other, the optical detection module and the cosmetic applicator are respectively located adjacent to the first surface and the second surface, or the optical detection module and the cosmetic applicator are both located adjacent to one of the first surface and the second surface.

3. The smart cosmetic device of claim 1, wherein the optical detection module directly captures a detection image containing the target object, and analyzes the detection image to acquire position information of the predefined feature.

4. The smart cosmetic device of claim 1, wherein the optical detection module and the cosmetic applicator are respectively located on two opposite surfaces of the main body, the specific mark and the optical detection module are located on the same surface of the main body.

5. The smart cosmetic device of claim 1, wherein the optical detection module identifies all features of the target object, and acquires position relation between the predefined feature and other features accordingly.

6. The smart cosmetic device of claim 1, wherein the optical detection module identifies a reference point of the target object, and acquires a distance and a direction of the predefined feature relative to the reference point in accordance with an optical tracking result of the optical detection module.

7. The smart cosmetic device of claim 1, wherein the optical detection module comprises at least one of an optical tracking sensor, an imager capturing sensor and a thermal sensor.

8. The smart cosmetic device of claim 1, wherein the cosmetic applicator determines whether the optical detection module aligns with the predefined feature of the target object in accordance with a detection result of the optical detection module.

9. The smart cosmetic device of claim 1, wherein the cosmetic applicator is automatically activated to spray the cosmetic material to the specific area of the target object when the optical detection module aligns with the predefined feature.

10. The smart cosmetic device of claim 1, wherein the smart cosmetic device further comprises an alarm unit electrically connected to the optical detection module, and adapted to output a warning signal when a detection result of the optical detection module conforms to a predefined condition.

11. The smart cosmetic device of claim 10, wherein the warning signal output by the alarm unit is a sound signal or a flash signal.

12. The smart cosmetic device of claim 1, wherein the cosmetic applicator sprays the cosmetic material in batches to the specific area of the target object in accordance with a motion detection result of the optical detection module relative to the target object.

13. The smart cosmetic device of claim 1, wherein the cosmetic applicator controls concentration or color of the cosmetic material sprayed to the specific area of the target object in accordance with an identification result of the optical detection module relative to the predefined feature.

14. The smart cosmetic device of claim 1, wherein the smart cosmetic device further comprises a level detector disposed within the main body and adapted to detection a tilted angle of the main body.

15. The smart cosmetic device of claim 14, wherein the level detector is a gyroscope adapted to detect and maintain an arranged angle of the main body.

16. The smart cosmetic device of claim 14, wherein the smart cosmetic device further comprises an alarm unit electrically connected to the level detector, and adapted to output a warning signal when a detection result of the level detector when a detection result of the level detector belonging to an abnormal situation.

17. The smart cosmetic device of claim 1, wherein the smart cosmetic device further comprises an image receiver electrically connected to the cosmetic applicator, and the cosmetic applicator sprays the cosmetic material in accordance with the predefined feature and a reference image received by the image receiver.

18. The smart cosmetic device of claim 1, wherein the smart cosmetic device is a portable cosmetic device, or is a fixed cosmetic device installed at a specific position.

* * * * *